(12) United States Patent
Takagi et al.

(10) Patent No.: US 9,033,804 B2
(45) Date of Patent: May 19, 2015

(54) GAME PROCESSING SERVER APPARATUS AND GAME PROCESSING SERVER SYSTEM

(71) Applicant: DeNA Co., Ltd., Tokyo (JP)

(72) Inventors: Yuzo Takagi, Tokyo (JP); Takehiro Kusano, Tokyo (JP); Satoshi Sekiguchi, Tokyo (JP); Wataru Takahashi, Tokyo (JP); Yuuki Abe, Tokyo (JP); Minehiro Nagata, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 4 days.

(21) Appl. No.: 13/727,949

(22) Filed: Dec. 27, 2012

(65) Prior Publication Data
US 2013/0324256 A1    Dec. 5, 2013

(30) Foreign Application Priority Data

May 31, 2012 (JP) ................................. 2012-125176

(51) Int. Cl.
*A63F 13/30* (2014.01)
*G07F 17/32* (2006.01)

(52) U.S. Cl.
CPC ............ *G07F 17/3227* (2013.01); *A63F 13/12* (2013.01); *A63F 2300/535* (2013.01); *A63F 2300/5566* (2013.01)

(58) Field of Classification Search
USPC .................................. 463/1–6, 30–36, 40–42
See application file for complete search history.

(56) References Cited

U.S. PATENT DOCUMENTS

| 6,443,840 B2* | 9/2002 | Von Kohorn | 463/17 |
| 8,210,925 B2* | 7/2012 | Johnson | 463/23 |
| 2010/0279762 A1* | 11/2010 | Sohn et al. | 463/23 |

FOREIGN PATENT DOCUMENTS

| JP | 2003-175281 | 6/2003 |
| JP | 2011-056129 | 3/2011 |

OTHER PUBLICATIONS

Goodman et al "Why Left 4 Dead Works" https://web.archive.org/web/20110107221643/http://www.gamasutra.com/view/feature/6235/why_left_4_dead_works.php posted as early as Jan. 7, 2011.*
Japanese Office Action mailed Sep. 4, 2012.

* cited by examiner

*Primary Examiner* — Ronald Laneau
*Assistant Examiner* — Ross Williams
(74) *Attorney, Agent, or Firm* — IPUSA, PLLC

(57) ABSTRACT

A game processing server apparatus, to which plural terminal devices each being operated by a player are connected via a network, configured to provide a game service to the plural terminal devices, includes a player management unit which manages an association of a target player with other of the plural players; and an event management unit which controls a generation of an event for the target player based on a winning probability parameter of the target player indicating a probability of the target player winning the game determined based on player information of the target player and the players associated with the target player.

14 Claims, 10 Drawing Sheets

FIG.4
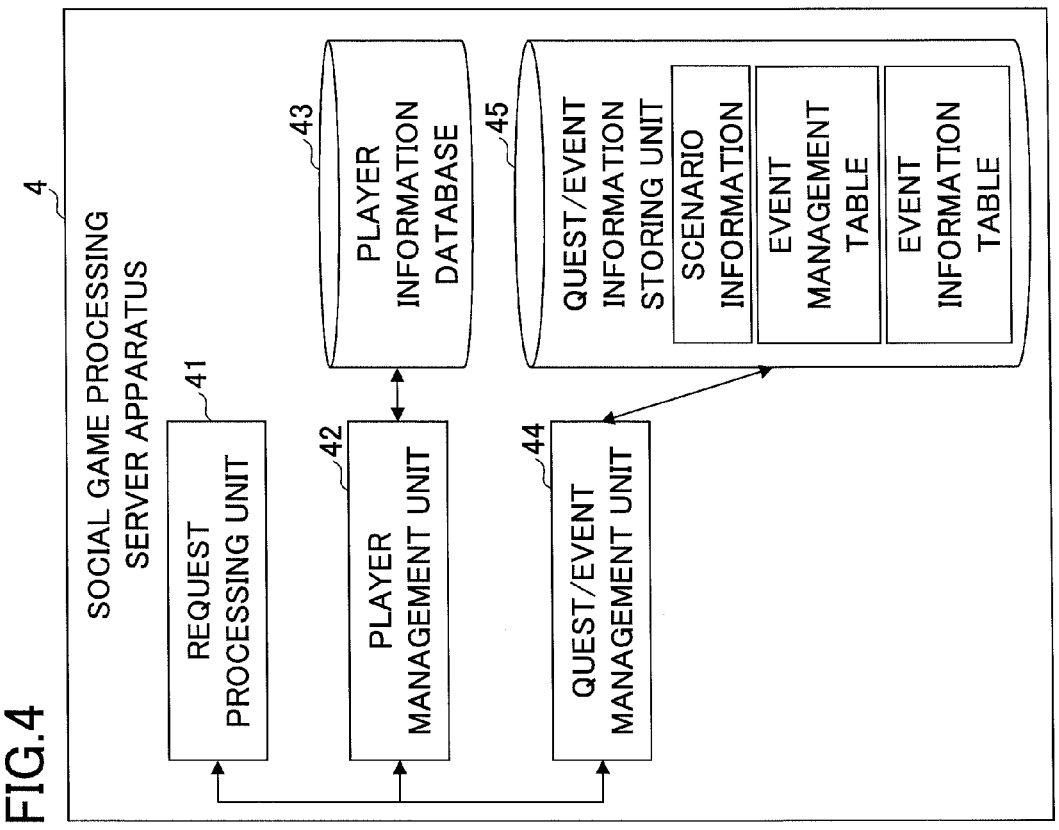
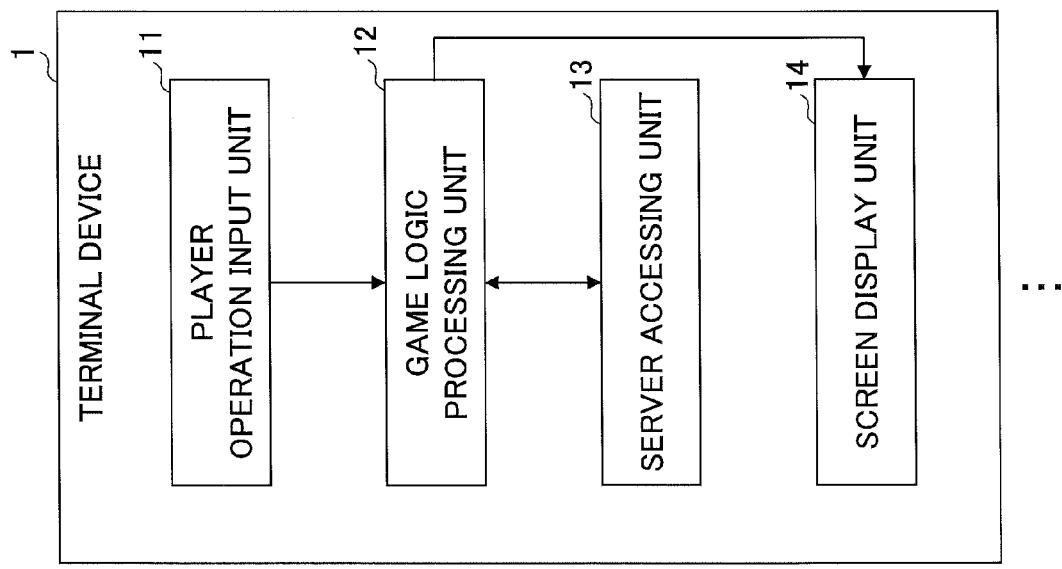

FIG.5

| PLAYER ID | ICON DATA | PLAYER NAME | PLAYER STRENGTH (LEVEL/HP/ AGGRESSIVENESS/ QUICKNESS/··) | TEAM STATUS | TEAM STATUS | (SPECIFIC EVENT STATUS) | FIGHTING HISTORY | POINTS | ·· |
|---|---|---|---|---|---|---|---|---|---|
| 1 | ICON DATA #1 | aaa | 5/70/90/30/·· | A(B) | 5 | FOUND BOSS | WIN/5MIN. (60MIN.) | 2000 | ·· |
| 2 | ICON DATA #2 | bbb | 1/35/52/15/·· | A(B) | 1 | NOT FOUND BOSS | WIN/5MIN. (60MIN.) | 500 | ·· |
| 3 | ICON DATA #3 | ccc | 3/42/66/27/·· | B(A) | 3 | NOT FOUND BOSS | LOSE/-MIN. (60MIN.) | 1000 | ·· |
| 4 | ICON DATA #4 | ddd | 4/81/77/25/·· | A(B) | 4 | NOT FOUND BOSS | WIN/5MIN. (60MIN.) | 1500 | ·· |
| 5 | ICON DATA #5 | eee | 3/65/81/11/·· | B(A) | 4 | NOT FOUND BOSS | LOSE/-MIN. (60MIN.) | 1200 | ·· |
| 6 | ICON DATA #6 | fff | 2/40/48/15/·· | B(A) | 2 | NOT FOUND BOSS | LOSE/-MIN. (60MIN.) | 600 | ·· |
| ·· | ·· | ·· | ·· | ·· | ·· | ·· | ·· | ·· | ·· |
| ·· | ·· | ·· | ·· | ·· | ·· | ·· | ·· | ·· | ·· |
| ·· | ·· | ·· | ·· | ·· | ·· | ·· | ·· | ·· | ·· |

FIG.7

| TIME ZONE | DOMINANCY | CONDITION OF SPECIFIC EVENT STATUS (FOR TEAM) | BOSS CHARACTER TYPE (CANDIDATE EVENT) | WEIGHT |
|---|---|---|---|---|
| CORE TIME | DOMINANT | ONLY OWN TEAM FOUND BOSS | NORMAL | 90 |
| CORE TIME | DOMINANT | ONLY OWN TEAM FOUND BOSS | RARE | 10 |
| CORE TIME | DOMINANT | ONLY OPPOSING TEAM FOUND BOSS | NORMAL | 10 |
| CORE TIME | NOT DOMINANT | ONLY OPPOSING TEAM FOUND BOSS | RARE | 90 |
| CORE TIME | NOT DOMINANT | ONLY OWN TEAM FOUND BOSS | NORMAL | 10 |
| CORE TIME | NOT DOMINANT | ONLY OWN TEAM FOUND BOSS | RARE | 90 |
| CORE TIME | NOT DOMINANT | ONLY OPPOSING TEAM FOUND BOSS | NORMAL | 90 |
| CORE TIME | NOT DOMINANT | ONLY OPPOSING TEAM FOUND BOSS | RARE | 10 |
| NON-CORE TIME | DOMINANT | ONLY OWN TEAM FOUND BOSS | NORMAL | 90 |
| NON-CORE TIME | DOMINANT | ONLY OWN TEAM FOUND BOSS | RARE | 10 |
| NON-CORE TIME | DOMINANT | ONLY OPPOSING TEAM FOUND BOSS | NORMAL | 90 |
| NON-CORE TIME | DOMINANT | ONLY OPPOSING TEAM FOUND BOSS | RARE | 10 |
| NON-CORE TIME | NOT DOMINANT | ONLY OWN TEAM FOUND BOSS | NORMAL | 10 |
| NON-CORE TIME | NOT DOMINANT | ONLY OWN TEAM FOUND BOSS | RARE | 90 |
| NON-CORE TIME | NOT DOMINANT | ONLY OPPOSING TEAM FOUND BOSS | NORMAL | 10 |
| NON-CORE TIME | NOT DOMINANT | ONLY OPPOSING TEAM FOUND BOSS | RARE | 90 |
| ... | ... | ... | ... | ... |

FIG.8

| TEAMS | EVENT (BOSS CHARACTER) | LEVEL | .. |
|---|---|---|---|
| .. | .. | .. | .. |
| .. | .. | .. | .. |
| .. | .. | .. | .. |

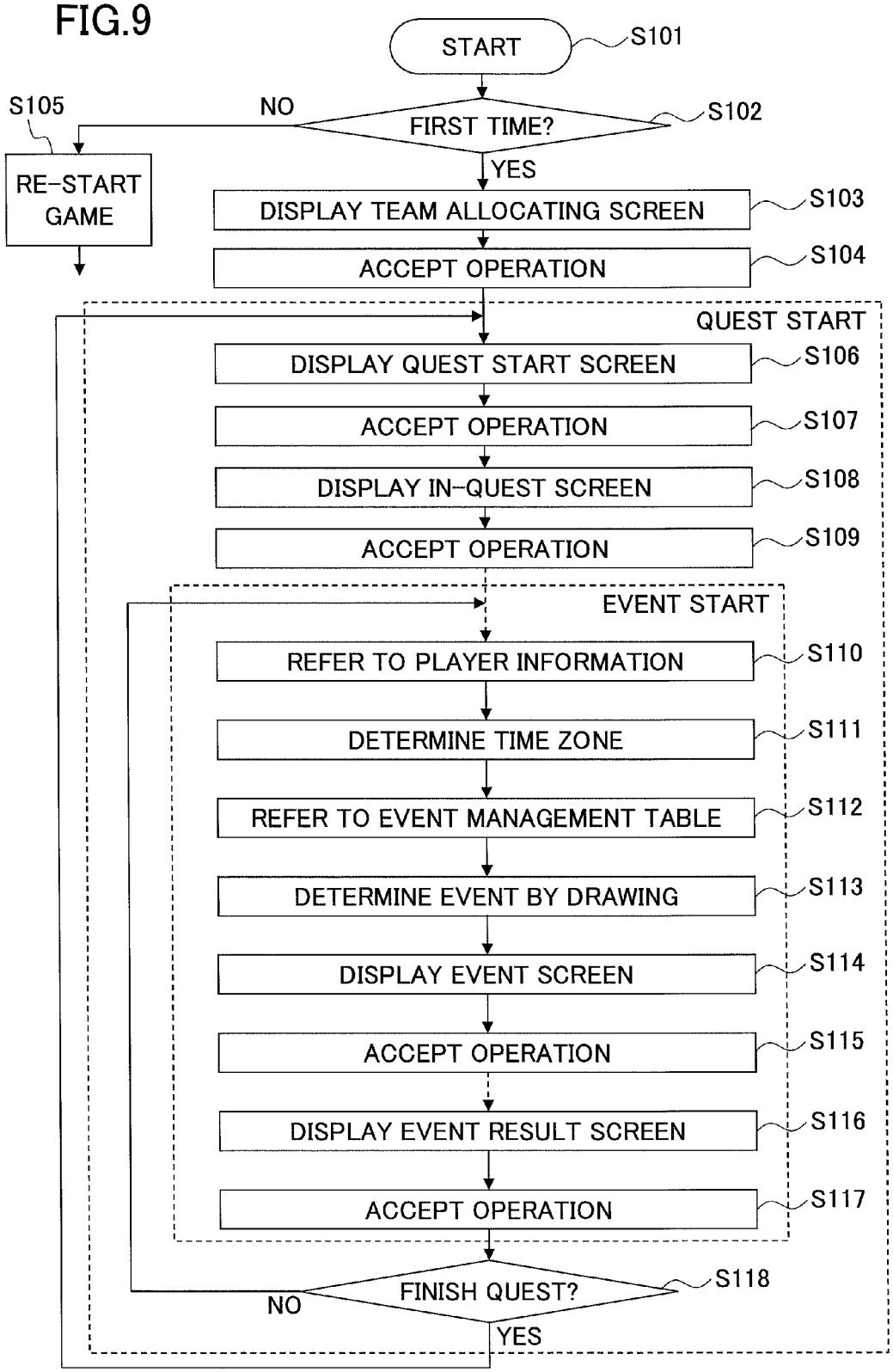

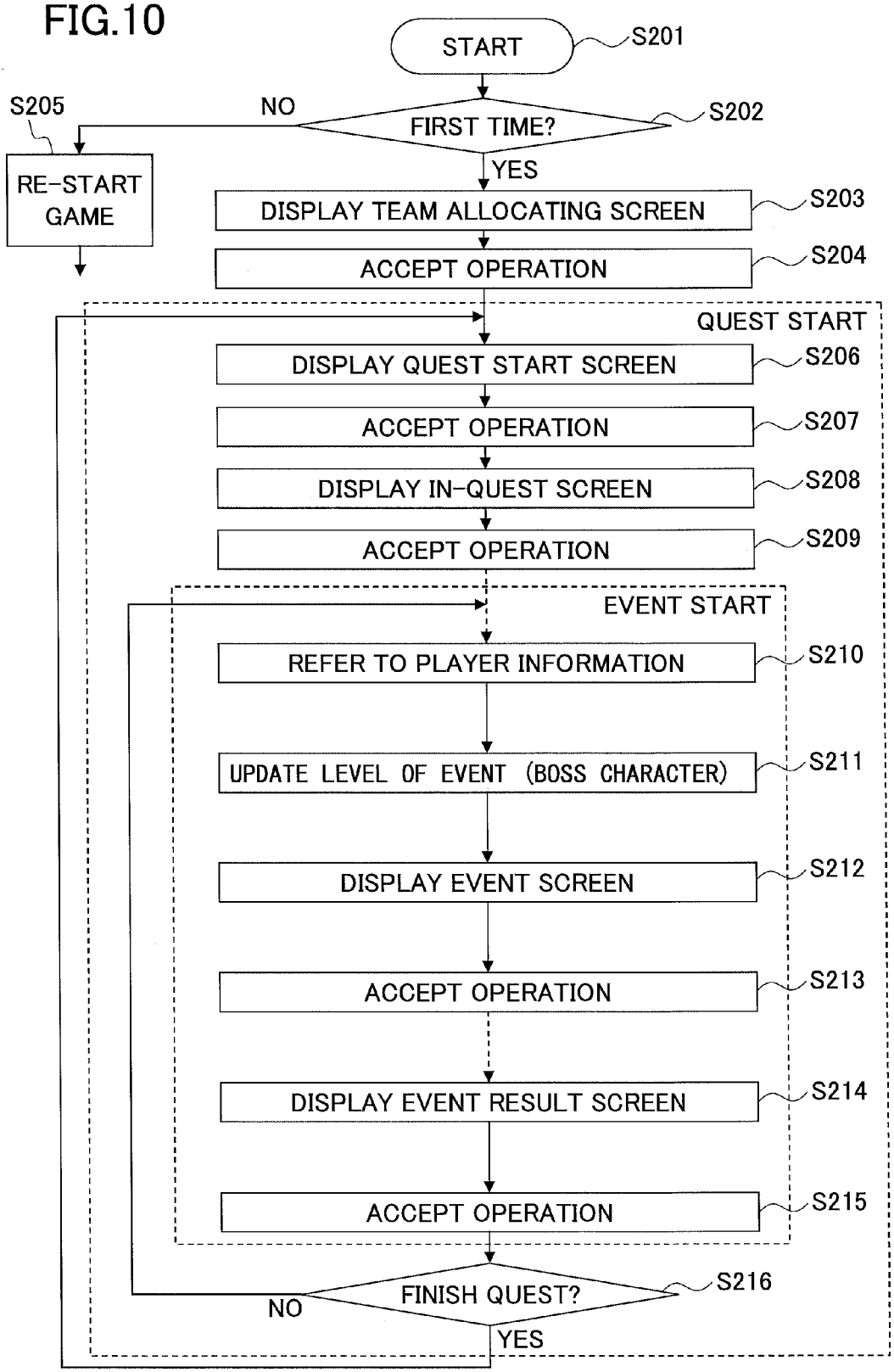

GAME PROCESSING SERVER APPARATUS AND GAME PROCESSING SERVER SYSTEM

BACKGROUND OF THE INVENTION

1. Field of the Invention

The present invention relates to a game processing server apparatus and a game processing server system.

2. Description of the Related Art

A social game is provided in a social networking service (SNS), and is an online game in which a player plays the game while having communications with other players. As the social game is provided in the SNS, which is proposed for providing communications between participants, the social game is configured to provide more communications to the players compared with a previously known online game although such an online game also provides communications to the players.

As one kind of such social games, a social Role Playing Game (RPG) is known. In the social RPG, a quest (mission) is provided in which a player character operated by a player (user) goes through a predetermined area in a map while playing the game.

In this quest, various events are set to occur when the player character goes through the predetermined area while consuming energy points or the like. For example, the player character can learn magic power, a skill or the like by encountering and defeating an enemy character or encountering a bonus item. Further, when the player clears a quest in an area where a boss character is set, the boss character appears so that the player character can fight against the boss character. When the player character defeats the boss character, the player character can get a weapon or a reward.

Thus, the player tries to clear quests and expects to obtain an ability, a weapon, a reward or the like through the predetermined events.

Especially, an appearance of an event such as encountering the boss character is considered as an important aspect in the game, and the player looks forward to the appearance of such an event.

Generally, the boss character is provided with a rank such as normal (N)), rare (R), super rare (SR) or the like in accordance with its strength or frequency of appearance. When the player character beats the boss character with the higher rank, the player character can obtain the stronger weapon or the higher reward.

As described above, the player considers the appearance of the event including encountering the boss character as an important aspect in the game. Here, there are strong players and weak players in a game world. Thus, sometimes it is easy for the strong player to beat the boss character with the higher rank while it is difficult for the weak player to beat the boss character even with the lower rank. Even in such a case, as long as the player enjoys the game by himself or herself, there may be no problem. The player just recognizes the boss character as strong or weak by himself or herself.

Similarly, even if the same character appears regardless of the fighting situation of the player in the game, as long as the player enjoys the game by himself or herself, there may be no problem.

However, for the social game, the players often have communications with other players, and sometimes, the players make a team to compete with other teams. Thus, the players often know how strong the boss character is before actually fighting against the boss character.

For example, a player may not enjoy the game anymore if the player cannot beat a boss character which is said to be very weak by other players. In such a case, the relative levels of the players (in fighting against other players or the like, for example) become sufficiently large to disturb a balance among players in the game world, and there is a possibility that the players cannot enjoy the game as a result.

SUMMARY OF THE INVENTION

The present invention is made in light of the above problems, and provides a game processing server apparatus capable of controlling a balance among players in the game world.

According to an embodiment, there is provided a game processing server apparatus, to which plural terminal devices each being operated by a player are connected via a network, configured to provide a game service to the plural terminal devices, including a player management unit which manages an association of a target player with other of the plural players; and an event management unit which controls a generation of an event for the target player based on a winning probability parameter of the target player indicating a probability of the target player winning the game determined based on player information of the target player and the players associated with the target player.

According to another embodiment, there is provided a non-transitory computer-readable recording medium having recorded thereon a program that causes a computer, to which plural terminal devices each being operated by a player are connected via a network, to provide a game service to the plural terminal devices and to execute a game processing method including a player management step of managing an association of a target player with other of the plural players; and an event management step of controlling a generation of an event for the target player based on a winning probability parameter of the target player indicating a probability of the target player winning the game determined based on player information of the target player and the players associated with the target player.

Note that also arbitrary combinations of the above-described constituents, and any exchanges of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 4 is a block diagram showing an example of a functional structure of the terminal device and the social game processing server apparatus;

FIG. 5 is a view showing an example of a data structure of player information stored in a player information database;

FIG. 7 is a view showing an example of a data structure of an event management table stored in the quest/event information storing unit;

FIG. 8 is a view showing an example of a data structure of an event information table;

FIG. 9 is a flowchart showing an example of an operation of the terminal device and the social game processing server apparatus of the embodiment; and FIG. 10 is another flowchart showing an example of an operation of the terminal device and the social game processing server apparatus of the embodiment.

DETAILED DESCRIPTION OF THE PREFERRED EMBODIMENTS

Figure 1:
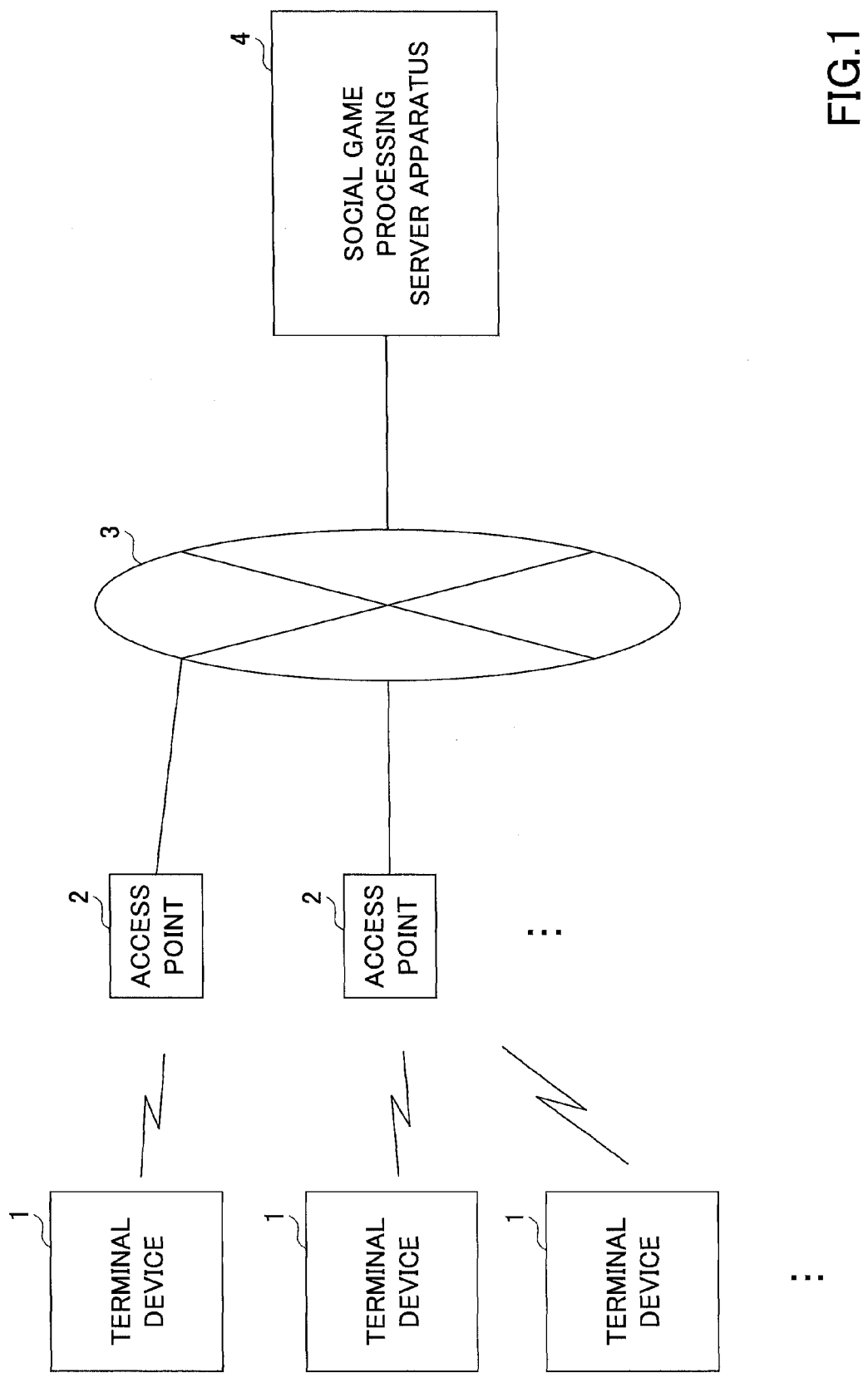
FIG. 1 is a block diagram showing a structure of an example of a system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Structure)

FIG. 1 is a block diagram showing a structure of an example of a system of an embodiment.

The system shown in FIG. 1 includes plural terminal devices 1 which belong to players (users), respectively, access points 2 such as a mobile base station, a Wi-Fi station or the like, a network 3 such as the INTERNET or the like, and a social game processing server apparatus 4. The social game processing server apparatus 4 controls processing of a social game (social network game) in which plural players play a game via the network 3.

Figure 2:
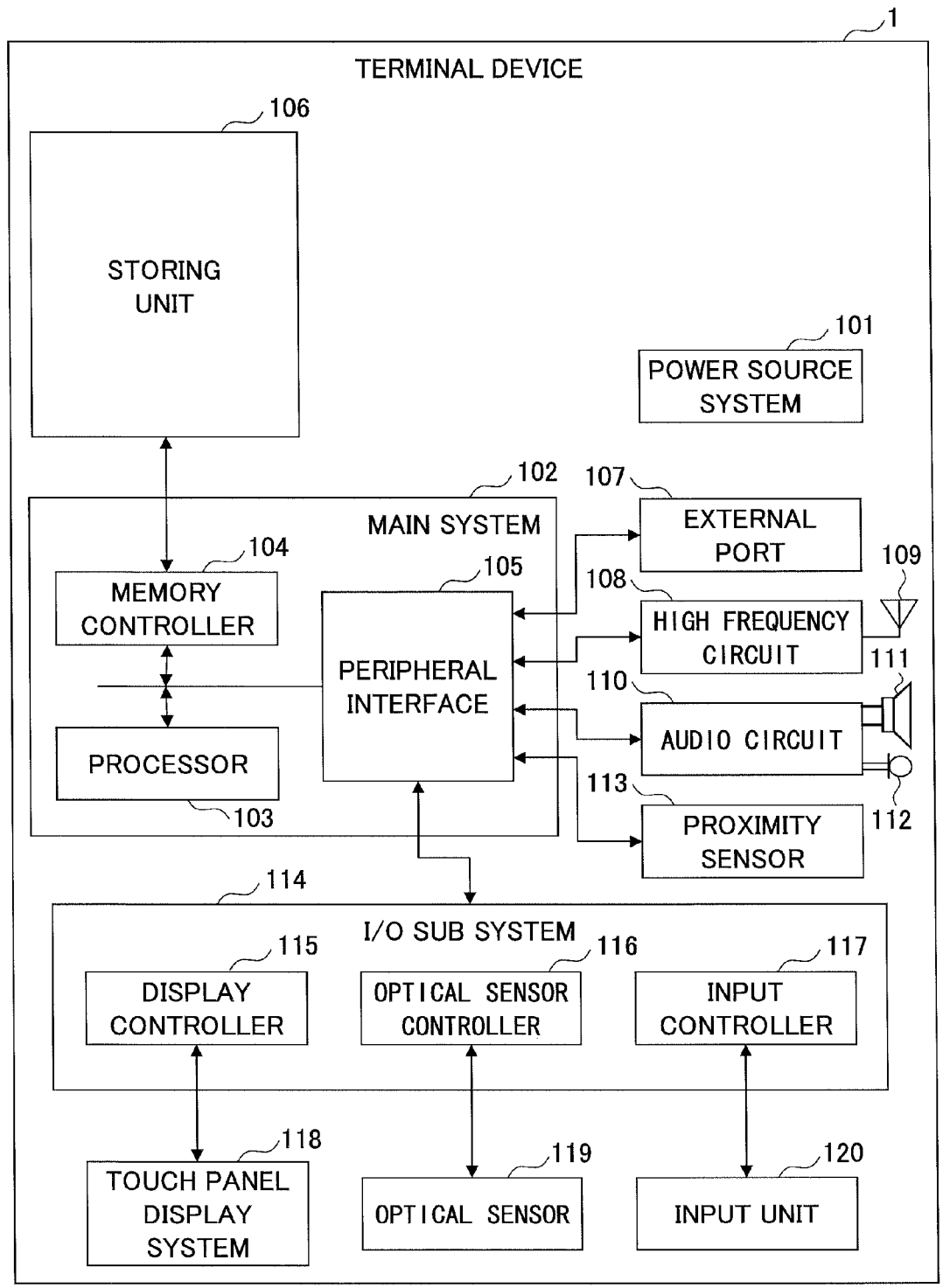
FIG. 2 is a block diagram showing an example of a hardware structure of a terminal device.

FIG. 2 is a block diagram showing an example of a hardware structure of the terminal device 1. The terminal device 1 may be a smart phone, a mobile phone or the like.

The terminal device 1 includes a power source system, 101, a main system 102, a storing unit 106, an external port 107, a high frequency circuit 108, an antenna 109, an audio circuit 110, a speaker 111, a microphone 112, a proximity sensor 113, an I/O sub system 114, a touch panel display system 118, an optical sensor 119 and an input unit 120. The main system 102 includes a processor 103, a memory controller 104 and a peripheral interface 105. The I/O sub system 114 includes a display controller 115, an optical sensor controller 116, and an input controller 117.

Figure 3:
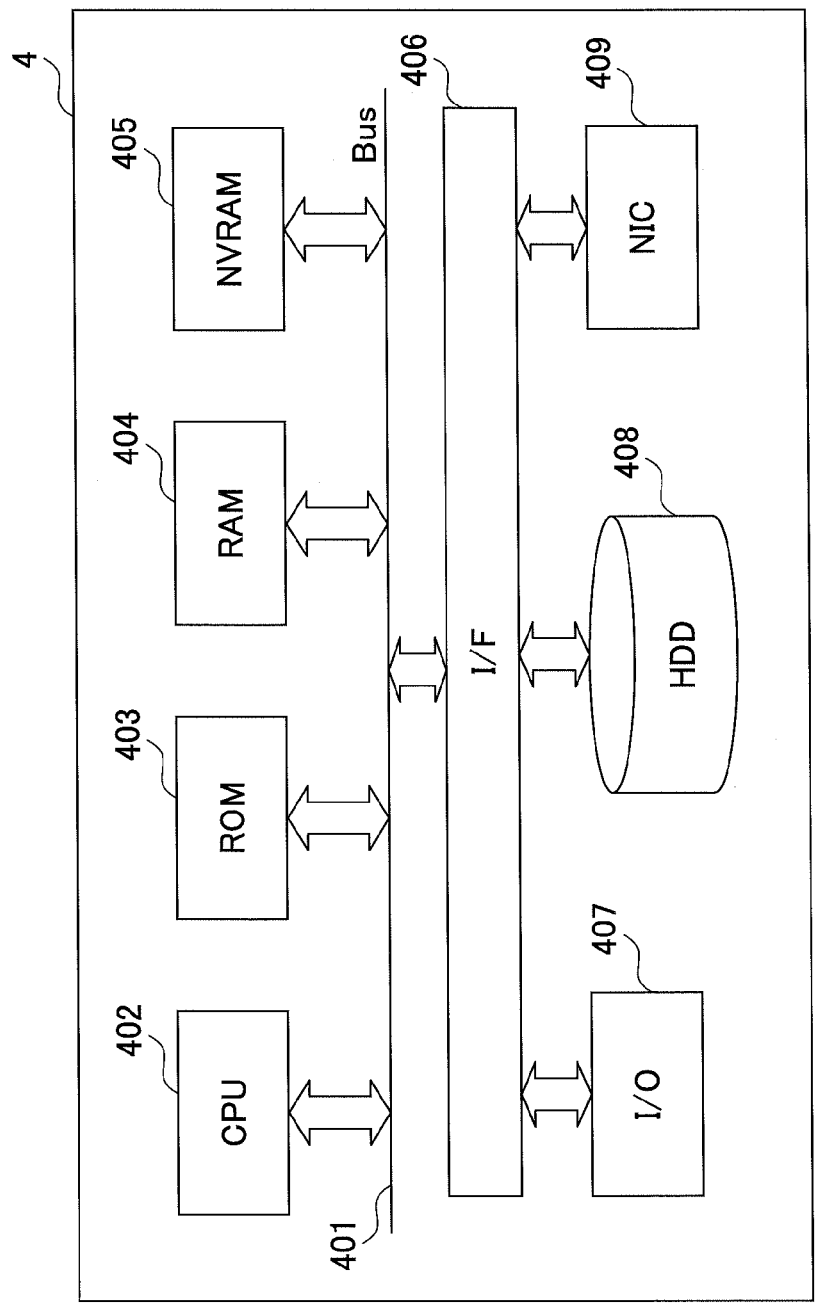
FIG. 3 is a block diagram showing an example of a hardware structure of a social game processing server apparatus.

FIG. 3 is a block diagram showing an example of a hardware structure of the social game processing server apparatus 4.

The social game processing server apparatus 4 includes a Central Processing Unit (CPU) 402, a Read Only Memory (ROM) 403, a Random Access Memory (RAM) 404, a non-Volatile Random Access Memory (NVRAM) 405 and an Interface (I/F) 406 connected to a system bus 401, and an Input/Output Device (I/O) 407 such as a keyboard, a mouse, a monitor, a Compact Disk/Digital Versatile Disk (CD/DVD) drive or the like, a Hard Disk Drive (HDD) 408, and a Network Interface Card (NIC) 409 connected to the I/F 406, and the like.

FIG. 4 is a block diagram showing an example of a functional structure of the terminal device 1 and the social game processing server apparatus 4.

In FIG. 4, the terminal device 1 includes a player operation input unit 11, a game logic processing unit 12, a server accessing unit 13, and a screen display unit 14.

The player operation input unit 11 has a function to input (accept) an operation of a player (user) of the terminal device 1.

The game logic processing unit 12 has a function to process a game by transitioning screens displayed by the screen display unit 14 in accordance with the operation by the player accepted via the player operation input unit 11.

The server accessing unit 13 has a function to communicate with the social game processing server apparatus 4. Specifically, the server accessing unit 13 sends a request to the social game processing server apparatus 4 when it is necessary to access the social game processing server apparatus 4 in the processing of the game logic processing unit 12. Then, the server accessing unit 13 receives a processed result or the like as a response from the social game processing server apparatus 4. Here, the request includes a request of updating and a request of referring to data. The request of updating is a request of processing an operation including updating player information. The request of referring to data is a request of processing an operation including referring to the player information.

The screen display unit 14 has a function to display screens on the touch panel display system 118 under control of the game logic processing unit 12.

The social game processing server apparatus 4 includes a request processing unit 41, a player management unit 42, a player information database 43, a quest/event management unit 44, and a quest/event information storing unit 45.

The request processing unit 41 has a function to receive a request from the terminal device 1 and process necessary operations. The request processing unit 41 further has a function to send the processed result of the request to the terminal device 1 as a response.

For the request of updating, the request processing unit 41 processes an operation including updating the player information, and the processed result may include the updated player information or the like. For the request of referring to data, the request processing unit 41 processes an operation including referring to the player information and obtaining a value of the player information. At this time, the processed result may include the obtained value of the player information. Further, the response includes screen information on which the player is to operate next, in addition to the required processed result.

The player management unit 42 has a function to manage various information items about all of the players participating in the game, which are stored in the player information database 43. The player management unit 42 refers to and updates the player information in accordance with a request by the request processing unit 41 or the quest/event management unit 44. An example of a data structure of the player information is explained later in detail.

The quest/event management unit 44 has a function to manage scenario information, an event management table, an event information table and the like, which are stored in the quest/event information storing unit 45.

The request processing unit 41 obtains information such as the scenario information, the event management table, the event information table or the like stored in the quest/event information storing unit 45 based on the request received from the terminal device 1. Then, the request processing unit 41 controls a generation of a quest (mission) or an event in accordance with a progression of the game in the terminal device 1. Examples of data structures of the scenario information, the event management table and the event information table are explained later in detail.

In this embodiment, the social game processing server apparatus 4 is configured to control a generation of an event for a target player, specifically, determine an event to be generated, for a target player based on a winning probability parameter of the target player indicating a probability of the target player winning the game determined based on player information of the target player and the players associated with the target player. As will be explained in detail, the player information may be a strength parameter, a fighting situation, a fighting history in a specific event or the like. In such a case, the winning probability parameter may be a dominancy of the strength parameter of the target player, a dominancy of the fighting situation of the target player, an easiness to clear the specific event for the target player, or the like, respectively.

FIG. 5 is a view showing an example of a data structure of the player information stored in the player information database 43. The player information is an example of a "record of the plural players".

In FIG. 5, the player information includes items (fields) such as "player ID", "icon data", "player name", "player strength", "team", "status", "specific event status", "fighting history", "points" and the like.

The "player ID" is data to specify (identify) the player. The "icon data" is data to specify a displayed icon of the player. The "player name" is data indicating the displayed name of the player.

The "player strength" is data (strength parameter) indicating the strength of the player in the game. The "player strength" includes a level, Hit Point (HP), aggressiveness, quickness or the like. When the level of the player increases, the values of HP, aggressiveness, quickness or the like are also increased.

The "team" is data indicating a team to which the player belongs and an opposing team to compete against regarding a common boss character.

The "status" is data indicating a status of the progression of the game for the player.

The "specific event status" is data of a status indicating whether a specific event is already generated (has happened) for the respective player. In this embodiment, the specific event is "find a boss character".

Alternatively, the "status" may include information of the "specific event status" and in such a case, the item "specific event status" may be omitted.

The "fighting history" is information about a result of an event in which fighting against the boss character or the like is required. The "fighting history" includes whether the player won or lost, a period used to beat the boss character (when the player won), and the time limit. The "points" is data indicating the points obtained by the player and expresses a fighting situation of the player in the game.

For the case shown in FIG. 5, the players named "aaa", "bbb" and "ddd" belong to the same team "A" whose opposing team is "B". Similarly, the players named "ccc", "eee" and "fff" belong to the same team "B" whose opposing team is "A". Further, only the player "aaa" has found the boss character among the players "aaa" to "fff".

In other words, the player named "bbb", for example, is associated with the players named "aaa" and "ddd" as being on the same team, and also associated with the players named "ccc", "eee" and "fff" as being on the opposing team.

Further, each of the players is in correspondence with the "player strength", the "status", the "specific event status", the "fighting history", and the "point".

Figure 6:
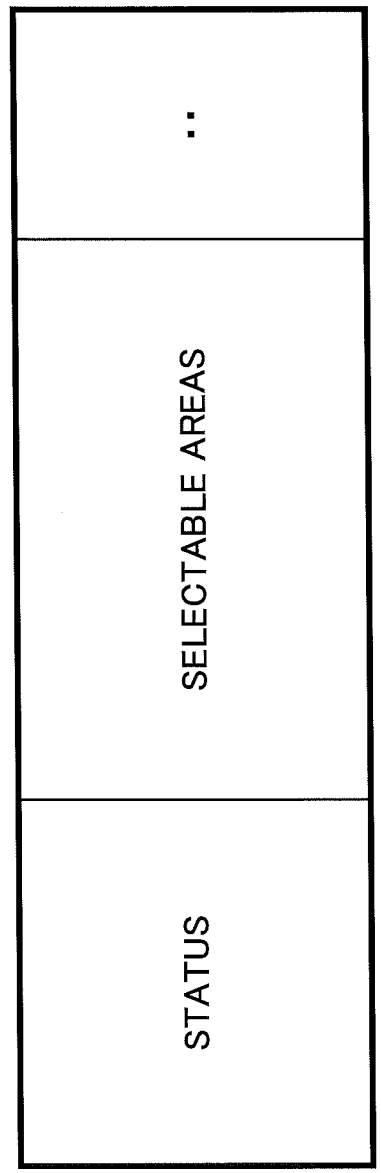
FIG. 6 is a view showing an example of a data structure of scenario information stored in a quest/event information storing unit.

FIG. 6 is a view showing an example of a data structure of the scenario information stored in the quest/event information storing unit 45.

In FIG. 6, the scenario information includes a status (mainly a stage) in correspondence with selectable areas (areas on a map at each of which a quest occurs). Generally, the areas are aligned in an order from easier to be conquered to harder to be conquered. First, only the areas easier to be conquered are set to be selectable.

FIG. 7 is a view showing an example of a data structure of the event management table stored in the quest/event information storing unit 45.

In FIG. 7, the event management table includes items (fields) such as "time zone", "dominancy", "condition of specific event status (for team)", "boss character type (candidate event)", "weight" and the like.

The "time zone" is data for specifying a kind of time. The "time zone" includes "core time" in which many players are expected to participate in the game, "non-core time" in which the number of players participating in the game is expected to be small, "maintenance time" in which maintenance of an operating side is performed, and the like. Although not shown in the drawing, the social game processing server apparatus 4 may include a table in which the time (corresponding to a current time) and the time zone are in correspondence with each other.

The "dominancy" is data of a condition of dominance indicating whether the own team (to which the target player belongs) is relatively dominant over the opposing team. The "dominancy" may include two categories such as "dominant" and "not dominant", or three categories including "equal" in addition to "dominant" and "not dominant" or the like. The "condition of dominancy" may include further divided categories expressed by values indicating power equation between opposing teams.

The dominancy may be determined based on the total value of the strengths of the players belonging to the own team and the total value of the strengths of the players belonging to the opposing team. Alternatively, the dominancy may be determined based on a relative fighting situation of the own team with respect to the opposing team.

The "condition of specific event status (for team)" is data of a condition of a status indicating whether the specific event is already generated (has happened) for the players on the own team and the opposing team. As described above, as the specific event is "find a boss character" in this embodiment, the "condition of specific event status (for team)" includes "only own team found boss", "only opposing team found boss", "both teams not found boss", "both teams found boss" and the like.

The "boss character type (candidate event)" is data for specifying a candidate event to be generated for the target player. In this embodiment, the candidate event is a kind of a boss character including its rank to appear for the target player.

The "weight" is a value which corresponds to a probability of the respective candidate event to be randomly selected by a drawing or the like.

Figure 8:
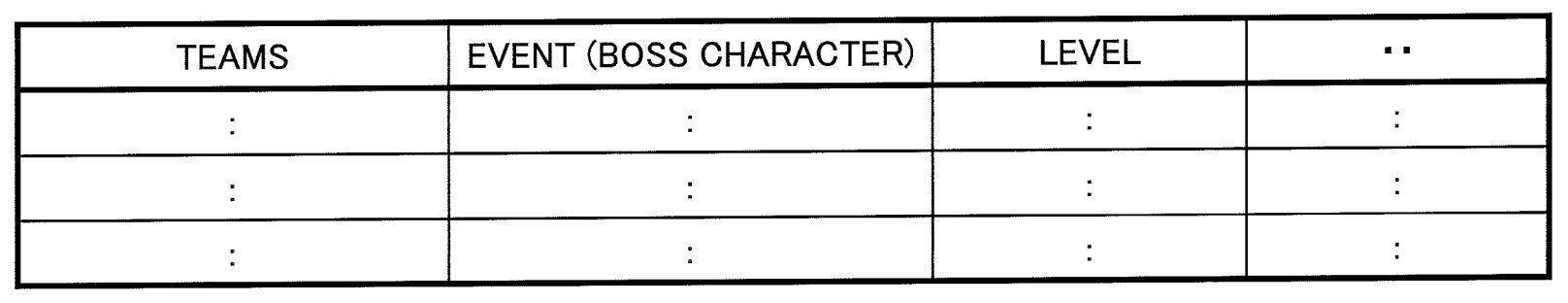

FIG. 8 is a view showing an example of a data structure of the event information table stored in the quest/event information storing unit 45.

In FIG. 8, the event information table includes data sets of a combination of two opposing teams, an event, and a level of the event. The event may be "a boss character appears" or the like. For the event, the content of the event may be specified (a boss character is specified, for example), or only a kind of event may be specified (the boss character is not specified but only a fact that a boss character appears is specified, for example). When the event set in the event information table is generated for the two opposing teams, the event is set to have the level defined in the information table.

(Operation: Pattern #1)

FIG. 9 is an example of a flowchart showing an operation of the terminal device 1 and the social game processing server apparatus 4 of the embodiment.

Here, it is assumed that the player, who is the target player, who operates the terminal device 1 is previously logged in to the social game processing server apparatus 4 so that the social game processing server apparatus 4 can specify the player ID of the target player.

At the terminal device 1, when the player operation input unit 11 accepts an operation by the player to start the game, the game logic processing unit 12 recognizes the operation to start the game. Then, the server accessing unit 13 transmits the operation to start the game to the social game processing server apparatus 4.

Then, at the social game processing server apparatus 4, the request processing unit 41 recognizes the operation to start the game and starts the processing (step S101). In the following, the operation of the request processing unit 41 to access (update) data stored in the player information database 43 is performed via the player management unit 42, and the operation of the request processing unit 41 to access (update) data stored in the quest/event information storing unit 45 is performed via the quest/event management unit 44 unless otherwise explained.

First, the request processing unit 41 determines whether it is the first time for the player to play the game (step S102). Specifically, the request processing unit 41 refers to the player information (FIG. 5) of the player information database 43 based on the player ID. Then, the request processing unit 41 can determine whether it is the first time for the player to play the game by determining whether the status of the respective player is set as an initial value.

When it is determined to be the first time for the player to play the game (YES of step S102), the request processing unit 41 allocates the player to one of the teams. Then, the request processing unit 41 sends screen information including a result of the allocation to have the terminal device 1 display a team allocating screen (step S103).

The allocation of the player to the team may be performed based on a predetermined rule. Alternatively, the allocation of the player to the team may be performed as follows. The request processing unit 41 selects a team whose number of players is small based on the player information stored in the player information database 43. Then, the request processing unit 41 updates the team for the player in the player information stored in the player information database 43.

The allocation of the team can be assumed as associating the target player with the other players as is explained above with reference to FIG. 5.

When the screen information including the result of the allocation is sent to the terminal device 1 and the server accessing unit 13 receives the screen information, the screen display unit 14 displays the team allocating screen under control of the game logic processing unit 12.

Here, the allocation of the team may be automatically performed at background without displaying the team allocating screen or the screen of confirmation for the player.

Then, at the terminal device 1, when the player operation input unit 11 accepts an operation of confirmation by the player (step S104), the server accessing unit 13 sends the confirmation by the player to the social game processing server apparatus 4 under control of the game logic processing unit 12. Then, at the social game processing server apparatus 4, the request processing unit 41 starts the subsequent processing.

When it is determined that it is not the first time for the player to play the game (NO of step S102), the above operation of the allocation of the team is not performed as the player is already allocated to a team. Then, the operation previously interrupted is re-started (step S105). The re-starting of the operation is performed as follows. The request processing unit 41 refers to the status in the player information stored in the player information database 43 based on the player ID of the player and specifies the processing corresponding to the status.

After the confirmation of the allocation (step S104) or when the game is re-started (step S105), the request processing unit 41 controls the terminal device 1 to display a quest start screen from which the player is capable of selecting a desired area to play the quest (step S106).

Specifically, the request processing unit 41 refers to the player information stored in the player information database 43 based on the player ID of the player and obtains the status. Then, based on the obtained status, the request processing unit 41 refers to the scenario information (FIG. 6) stored in the quest/event information storing unit 45 and obtains the selectable areas corresponding to the status (stage). Then, the request processing unit 41 generates the quest start screen from the obtained selectable areas and sends the quest start screen to the terminal device 1.

Then, at the terminal device 1, when the server accessing unit 13 receives the quest start screen, the screen display unit 14 displays the quest start screen under control of the game logic processing unit 12.

Then, when the player operation input unit 11 accepts a selection of the area by the player (step S107), the server accessing unit 13 sends the selection by the player to the social game processing server apparatus 4 under control of the game logic processing unit 12. Then, the quest is started.

When the quest is started, the request processing unit 41 controls the terminal device 1 to display an "in-quest screen" including an image in which the player character goes through the selected area (step S108). It means that the request processing unit 41 sends the "in-quest screen" to the terminal device 1. Then, when the server accessing unit 13 of the terminal device 1 receives the in-quest screen, the screen display unit 14 displays the in-quest screen under control of the game logic processing unit 12.

Then, when the player operation input unit 11 of the terminal device 1 accepts an operation by the player to proceed or the like (step S109), the server accessing unit 13 sends the operation by the player to the social game processing server apparatus 4 under control of the game logic processing unit 12. Then, the request processing unit 41 of the social game processing server apparatus 4 starts the subsequent processing. When the displaying of the in-quest screens continues, the above operation is repeated.

Then, the request processing unit 41 refers to the player information stored in the player information database 43 based on the player ID of the player (target player) and obtains the player strengths and the specific event statuses of the target player and the other players associated with the target player (step S110). At this time, the request processing unit 41 differentiates the other players who belong to the same team (own team) with the target player and who belong to the opposing team of the target player.

Then, the request processing unit 41 determines the "dominancy" of the own team (in which the target player is included) against the opposing team. Specifically, the request processing unit 41 calculates the strength of the own team and the strength of the opposing team based on the player strengths of the players on the own team and the players on the opposing team. The strength of each of the teams may be calculated by the total amount, the average amount, the maximum amount or the like of the levels of the players in each of the teams, for example. Then, the request processing unit 41 determines that the own team is "dominant" when the strength of the own team is greater than that of the opposing team, and determines that the own team is "not dominant" when the strength of the own team is less than that of the opposing team, by comparing the strengths of the teams. At this time, the request processing unit 41 may determine the "dominancy" of the own team as "equal" when the strengths are the same.

Alternatively, the request processing unit 41 may determine the "dominancy" of the own team by comparing the fighting situations of the own team and the opposing team, determine that the own team is "dominant" when the own team is dominant, and determine that the own team is "not dominant" when the own team is not dominant. The fighting situations may be determined based on whether the players in the own team or the opposing team has found a boss character, based on the points obtained by the players in the own team and the opposing team, or the like. For example, when only the member in the own team has found the boss character (when the specific event status is "only own team found boss"), the request processing unit 41 may determine that the own team is dominant, for example.

Further, the request processing unit 41 determines the specific event status for the team of the target player. Specifically, these operations may be performed by the player management unit 42 and the quest/event management unit 44 under control of the request processing unit 41.

For example, for the case shown in FIG. 5, it is assumed that the target player is the player named "bbb" and only the player named "aaa", who belongs to the same team as the player named "bbb", has already found the boss character.

At this time, when the "dominancy" of the own team is determined based on the strengths between the teams, the total value of the levels of the players defined in the "player strength" for the players named "aaa", "bbb" and "ddd", who belong to the team A, are 5+1+4=10 while that for the players named "ccc", "eee" and "fff", who belong to the team B, are 3+3+2=8. Thus, the "dominancy" of the own team becomes "dominant".

Similarly, when the "dominancy" of the own team is determined based on the fighting situations between the teams, as only the player named "aaa" has already found the boss character, the "dominancy" of the own team becomes "dominant".

Further for example, the specific event status for the team of the target player becomes "only own team found boss". Alternatively, when it is assumed that the target player is the player named "ccc" and only the player named "aaa", who belongs to the opposing team of the player named "bbb", has already found the boss character, the specific event status for team for the target player becomes "only opposing team found boss". Further, alternatively, when it is assumed that the target player is the player named "bbb" and nobody on the teams A and B has found the boss character, the specific event status for the team of the target player becomes "both teams not found boss".

Further, alternatively, the player information database 43 may include an item "dominancy (for team)" and/or "specific event status for team". In such a case, the request processing unit 41 may update data for the "dominancy" and/or the "specific event status for team" every time the dominancy changes and/or the specific event is generated for any of the players, respectively.

Then, the request processing unit 41 obtains the current time, and then refers to the table, not shown in the drawings, in which the current time and the time zone are in correspondence with each other. Then, the request processing unit 41 determines the time zone to which the current time belongs (step S111).

Then, the request processing unit 41 refers to the event management table (FIG. 7) stored in the quest/event information storing unit 45. Then, the request processing unit 41 selects the candidate events (boss character types) for which the dominancy, the specific event status for teams and the time zone determined as above meet the condition of dominancy, the condition of specific event status for teams and the time zone set in the event management table. Then, the request processing unit 41 obtains the selected candidate events (boss character types) and the weights of the selected candidate events (boss character types), respectively, (step S112).

Then, the request processing unit 41 randomly selects an event (boss character type) to be generated for the target player in accordance with a probability which is in proportion to the obtained weights (step S113).

For example, when the dominancy determined as above is "dominant", the specific event status for teams as determined above is "only own team found boss" and the time zone determined as above is "core time", for the case shown in FIG. 7, two records from the upper side in the event management table meet the determined condition for the target player. In such a case, a ratio of the respective weight with respect to a total weight of the two records, 90+10=100, is set to be a probability for each of the records. Then, the event (boss character type) to be generated for the target player is randomly selected.

Specifically, these operations to determine the event to be generated for the target player may be performed by the quest/event management unit 44 under control of the request processing unit 41.

Here, for the event management table shown in FIG. 7, the weights are determined such that a rare boss character is easily selected when the own team is not dominant (in contrast, the rare boss character is not easily selected when the own team is dominant). Thus, the rare boss character tends to appear for a team which is relatively not dominant so that the players in the team can obtain higher ability by beating the rare boss character. Therefore, a balance between the team which is not dominant and the team which is dominant can be maintained to cause a tight game. Further, when the specific event status is "only own team found boss", for example, the own team is evaluated to be dominant as explained above.

For the time zone, the weights are determined based on an operation policy.

Thereafter, the request processing unit 41 controls the terminal device 1 to display an event screen including an image of the event as determined above (step S114). In other words, the request processing unit 41 sends the event screen to the terminal device 1. Then, when the server accessing unit 13 of the terminal device 1 receives the event screen, the screen display unit 14 displays the event screen under control of the game logic processing unit 12.

Then, when the player operation input unit 11 of the terminal device 1 accepts an operation by the player of the event (step S115), the server accessing unit 13 sends the operation by the player to the social game processing server apparatus 4 under control of the game logic processing unit 12. Then, the request processing unit 41 of the social game processing server apparatus 4 starts the subsequent processing. When the event screen is composed of plural screens, the above operation is repeated.

Thereafter, when the event ends in accordance with the operation by the player, the request processing unit 41 controls the terminal device 1 to display an event result screen including the result of the event (step S116). In other words, the request processing unit 41 sends the event result screen to the terminal device 1. Then, when the server accessing unit 13 of the terminal device 1 receives the event result screen, the screen display unit 14 displays the event result screen under control of the game logic processing unit 12. As the result of the event, the player character can obtain an ability such as magic power, a skill or the like, a weapon, or a reward.

Then, when the player operation input unit 11 of the terminal device 1 accepts an operation by the player of confirmation or the like (step S117), the server accessing unit 13 sends the confirmation by the player to the social game processing server apparatus 4 under control of the game logic processing unit 12. Then, the request processing unit 41 of the social game processing server apparatus 4 starts the subsequent processing.

Thereafter, the request processing unit 41 determines whether the quest is finished (step S118). Whether the quest is finished may be determined based on whether the player character has reached the end of the area.

When it is determined that the quest is not finished (NO of step S118), the operation moves back to step S110.

When it is determined that the quest is finished (YES of step S118), the operation moves back to step S106.

Here, in the above processes, the player operating the terminal device 1 can stop the game before and after the operation, and can start the game from the same status when re-starting the game.

Further, in the above embodiment, the event (boss character type) to be generated is determined by referring to the event management table based on the dominancy, the specific event status and the time zone; however, only the dominancy may be used, as the dominancy is the most important factor. (Operation: Pattern #2)

In the above described operation of pattern #1, the event (boss character type) to be generated is determined based on the dominancy or the like of the own team and the opposing team. Alternatively, in the operation of a pattern #2, which is explained in the following, the level of the event (boss character type) is determined based on the fighting history of the boss character or the like.

FIG. 10 is another example of a flowchart showing an operation of the terminal device 1 and the social game processing server apparatus 4 of the embodiment.

Here, it is assumed that the player, who is the target player, who operates the terminal device 1 is previously logged in to the social game processing server apparatus 4 so that the social game processing server apparatus 4 can specify the player ID of the target player.

At the terminal device 1, when the player operation input unit 11 accepts an operation by the player to start the game, the game logic processing unit 12 recognizes the operation to start the game. Then, the server accessing unit 13 transmits the operation to start the game to the social game processing server apparatus 4.

Then, at the social game processing server apparatus 4, the request processing unit 41 recognizes the operation to start the game and starts the processing (step S201). In the following, the operation of the request processing unit 41 to access (update) data stored in the player information database 43 is performed via the player management unit 42, and the operation of the request processing unit 41 to access (update) data stored in the quest/event information storing unit 45 is performed via the quest/event management unit 44 unless otherwise explained.

First, the request processing unit 41 determines whether it is the first time for the player to play the game (step S202). Specifically, the request processing unit 41 refers to the player information (FIG. 5) of the player information database 43 based on the player ID. Then, the request processing unit 41 can determine whether it is the first time for the player to play the game by determining whether the status of the respective player is set as an initial value.

When it is determined to be the first time for the player to play the game (YES of step S202), the request processing unit 41 allocates the player to one of the teams. Then, the request processing unit 41 sends screen information including a result of the allocation to have the terminal device 1 display a team allocating screen (step S203).

The allocation of the player to the team may be performed based on a predetermined rule. Alternatively, the allocation of the player to the team may be performed as follows. The request processing unit 41 selects a team for which the number of the players belonging to is small based on the player information stored in the player information database 43. Then, the request processing unit 41 updates the team for the player in the player information stored in the player information database 43.

The allocation of the team can be assumed as associating the target player with the other players as is explained above with reference to FIG. 5.

When the screen information including the result of the allocation is sent to the terminal device 1 and the server accessing unit 13 receives the screen information, the screen display unit 14 displays the team allocating screen under control of the game logic processing unit 12.

Here, the allocation of the team may be automatically performed at background without displaying the team allocating screen or the screen of confirmation for the player.

Then, at the terminal device 1, when the player operation input unit 11 accepts an operation of confirmation by the player (step S204), the server accessing unit 13 sends the confirmation by the player to the social game processing server apparatus 4 under control of the game logic processing unit 12. Then, at the social game processing server apparatus 4, the request processing unit 41 starts the subsequent processing.

When it is determined that it is not the first time for the player to play the game (NO of step S202), the above operation of the allocation of the team is not performed as the player is already allocated to the team. Then, the operation previously interrupted is re-started (step S205). The re-starting of the operation is performed as follows. The request processing unit 41 refers to the status in the player information stored in the player information database 43 based on the player ID of the player and specifies the processing corresponding to the status.

After the confirmation of the allocation (step S204) or when the game is re-started (step S205), the request processing unit 41 controls the terminal device 1 to display a quest start screen from which the player is capable of selecting a desired area to play the quest (step S206).

Specifically, the request processing unit 41 refers to the player information stored in the player information database 43 based on the player ID of the player and obtains the status. Then, based on the obtained status, the request processing unit 41 refers to the scenario information (FIG. 6) stored in the quest/event information storing unit 45 and obtains the selectable areas corresponding to the status (stage). Then, the request processing unit 41 generates the quest start screen from the obtained selectable areas and sends the quest start screen to the terminal device 1.

Then, at the terminal device 1, when the server accessing unit 13 receives the quest start screen, the screen display unit 14 displays the quest start screen under control of the game logic processing unit 12.

Then, when the player operation input unit 11 accepts a selection of the area by the player (step S207), the server accessing unit 13 sends the selection by the player to the social game processing server apparatus 4 under control of the game logic processing unit 12. Then, the quest is started.

When the quest is started, the request processing unit 41 controls the terminal device 1 to display an "in-quest screen" including an image in which the player character goes through the selected area (step S208). It means that the request processing unit 41 sends the "in-quest screen" to the terminal device 1. Then, when the server accessing unit 13 of the terminal device 1 receives the in-quest screen, the screen display unit 14 displays the in-quest screen under control of the game logic processing unit 12.

Then, when the player operation input unit 11 of the terminal device 1 accepts an operation by the player to proceed or the like (step S209), the server accessing unit 13 sends the operation by the player to the social game processing server apparatus 4 under control of the game logic processing unit 12. Then, the request processing unit 41 of the social game processing server apparatus 4 starts the subsequent processing. When the displaying of the in-quest screens continues, the above operation is repeated.

Then, the request processing unit 41 refers to the player information stored in the player information database 43 based on the player ID of the player (target player) and obtains the fighting histories of the target player and the other players associated with the target player (step S210). At this time, the request processing unit 41 differentiates the other players who belong to the same team (own team) with the target player and who belong to the opposing team of the target player.

Then, the request processing unit 41 determines whether to change the level of the event (boss character) based on the obtained fighting histories. When the request processing unit 41 determines it is necessary to change, the request processing unit 41 updates the level of the respective event (boss character) in the event information table of the quest/event management unit 44 (step S211). The events may be specified by event ID or the like.

For example, it is assumed that the boss character is beaten within five minutes, where the time limit is set as 60 minutes, by the own team or the opposing team in the previous battle. It means that the boss character is beaten in a relatively short period. Thus, in such a case, the level of the boss character is increased. Further, for example, when the boss character is beaten using 90% of the time limit, the level of the boss character is retained. The level of the boss character may be determined using a table in which a period required for beating the boss character and a level range including an upper value and a lower value are in correspondence with each other. Further, the level of the boss character may be decreased when the boss character is not beaten within the time limit.

Thereafter, the request processing unit 41 controls the terminal device 1 to display an event screen including an image of the event as determined above (step S212). In other words, the request processing unit 41 sends the event screen to the terminal device 1. Then, when the server accessing unit 13 of the terminal device 1 receives the event screen, the screen display unit 14 displays the event screen under control of the game logic processing unit 12.

Then, when the player operation input unit 11 of the terminal device 1 accepts an operation by the player to the event (step S213), the server accessing unit 13 sends the operation by the player to the social game processing server apparatus 4 under control of the game logic processing unit 12. Then, the request processing unit 41 of the social game processing server apparatus 4 starts the subsequent processing. When the event screen is composed of plural screens, the above operation is repeated.

Thereafter, when the event ends in accordance with the operation by the player, the request processing unit 41 controls the terminal device 1 to display an event result screen including the result of the event (step S214). In other words, the request processing unit 41 sends the event result screen to the terminal device 1. Then, when the server accessing unit 13 of the terminal device 1 receives the event result screen, the screen display unit 14 displays the event result screen under control of the game logic processing unit 12. As the result of the event, the player character can obtain an ability such as magic power, a skill or the like, a weapon, or a reward.

Then, when the player operation input unit 11 of the terminal device 1 accepts an operation by the player of confirmation or the like (step S215), the server accessing unit 13 sends the confirmation by the player to the social game processing server apparatus 4 under control of the game logic processing unit 12. Then, the request processing unit 41 of the social game processing server apparatus 4 starts the subsequent processing.

Thereafter, the request processing unit 41 determines whether the quest is finished (step S216). Whether the quest is finished may be determined based on whether the player character has reached the end of the area.

When it is determined that the quest is not finished (NO of step S216), the operation moves back to step S210.

When it is determined that the quest is finished (YES of step S216), the operation moves back to step S206.

Here, in the above processes, the player operating the terminal device 1 can stop the game before and after the operation, and can start the game from the same status when restarting the game.

In this embodiment, the request processing unit 41, the quest/event management unit 44, and the player management unit 42 function as an event generating control unit which controls generation of a predetermined event, a player strength parameter management unit which manages a strength parameter of each of the players, a player fighting status management unit which manages a fighting status of each of the players, and a fighting history management unit which manages a fighting history of each of the players.

Further, the components of the social game processing server apparatus 4 may not be included in a single apparatus and may be provided in plural apparatuses connected via a network or the like with each other. For example, the player information database 43 or the quest/event information storing unit 45 may be provided in a different apparatus from an apparatus including the request processing unit 41, the player management unit 42 and the quest/event management unit 44. The social game processing server apparatus 4 or a system including such apparatuses may be referred to as a "game processing server system".

The individual constituents of the social game processing server apparatus 4 or each of the terminal devices 1 may be embodied by arbitrary combinations of hardware and software, typified by a CPU of an arbitrary computer, memory, a program loaded in the memory so as to embody the constituents illustrated in the drawings, storage units for storing the program such as a hard disk, and an interface for network connection. It may be understood by those skilled in the art that methods and devices for the embodiment allow various modifications.

As described above, according to the embodiment, a balance among players in the game world can be controlled.

According to the embodiment, a game processing server apparatus and a game processing server system capable of controlling a balance among players in the game world can be provided.

Although a preferred embodiment of the game processing server apparatus has been specifically illustrated and described, it is to be understood that minor modifications may be made therein without departing from the spirit and scope of the invention as defined by the claims.

The present invention is not limited to the specifically disclosed embodiments, and variations and modifications may be made without departing from the scope of the present invention.

The present application is based on Japanese Priority Application No. 2012-125176 filed on May 31, 2012, the entire contents of which are hereby incorporated by reference.

What is claimed is:

1. A game processing server apparatus including a processor and a memory, to which a plurality of terminal devices each operated by a player are connected via a network, configured to provide a game service which is a social RPG that manage all of the players and in which players do not directly fight against each other but compete with each other by at least obtained points in the game, to the plurality of terminal devices, comprising:
   a request processing unit that receives a request from each of the plurality of terminal devices and controls each of the plurality of terminal devices to display an event screen including an image of a predetermined event in a game, via the network;
   a player management unit that registers the players in association with each other and manages the association of the players, the association of the players including an association of each of the players and an opposing player of the respective player;
   an event management unit that controls a generation of the predetermined event in the game for each of the players; and
   a player strength parameter management unit that manages strength parameters of the players, respectively,
   wherein the event management unit, for each of the players,
      determines a status of dominance for the respective player indicating whether the respective player is relatively dominant over the opposing player of the respective player based on the strength parameters of the players, respectively, managed by the player strength parameter management unit,
      refers to a table including a first plurality of candidate types of event and weights each of which is in correspondence with a condition of dominance indicating that a target player is relatively dominant over an opposing player, and a second plurality of candidate types of event and weights each of which is in correspondence with a condition of dominance indicating that a target player is relatively not dominant over an opposing player,
      randomly selects a type of event for the respective player among the first plurality of candidate types of event when the respective player is determined to be relatively dominant over the opposing player using the weights, and randomly selects a type of event for the respective player among the second plurality of candidate types of event when the respective player is determined to be not relatively dominant over the opposing player using the weights, and
   controls a generation of a new event based on the selected type of event for the respective player, and
   wherein the request processing unit controls the terminal device of the respective player to display an event screen including an image of the new event in the game generated by the event management unit, via the network.

2. The game processing server apparatus according to claim 1,
   wherein the players associated with each other by the player management unit include the players belong to a first team and the players belong to another second team that compete against the first team.

3. The game processing server apparatus according to claim 1,
   wherein the event management unit manages event generation statuses of the players, respectively;
   in the table, the first plurality of candidate types of event and the second plurality of candidate types of event are further in correspondence with the event generation statuses of the players, respectively, and
   the event management unit randomly selects the type of event for the respective player from the table for which the event generation statuses are met.

4. The game processing server apparatus according to claim 1,
   wherein in the table, the first plurality of candidate types of event and the second plurality of candidate types of event are further in correspondence with time zones to which a current time is to be included, respectively, and
   the event management unit randomly selects the type of event for the respective player from the table for which the time zones are met.

5. The game processing server apparatus according to claim 1,
   wherein in the table, the weight for the candidate type of event that a character, for which a player is capable of obtaining a higher ability by beating the character, appears in the game for the target player is set higher when the status of dominance for the target player is not dominant compared with a case when the status of dominance for the target player is dominant.

6. A game processing server apparatus including a processor and a memory, to which a plurality of terminal devices each operated by a player are connected via a network, configured to provide a game service which is a social RPG that manage all of the players and in which players do not directly fight against each other but compete with each other by at least obtained points in the game, to the plurality of terminal devices, comprising:
   a request processing unit that receives a request from each of the plurality of terminal devices and controls each of the plurality of terminal devices to display an event screen including an image of a predetermined event in a game, via the network;
   a player management unit that registers the players in association with each other and manages the association of the players, the association of the players including an association of each of the players and an opposing player of the respective player;

an event management unit that controls a generation of the predetermined event in the game for each of the players; and a player fighting situation management unit that manages fighting situations of the players, respectively, wherein the event management unit, for each of the players, determines a status of dominance for the respective player indicating whether the respective player is relatively dominant over the opposing player of the respective player based on the fighting situations of the players, respectively, managed by the player strength parameter management unit, refers to a table including a first plurality of candidate types of event and weights each of which is in correspondence with a condition of dominance indicating that a target player is relatively dominant over an opposing player, and a second plurality of candidate types of event and weights each of which is in correspondence with a condition of dominance indicating that a target player is relatively not dominant over an opposing player, randomly selects a type of event for the respective player among the first plurality of candidate types of event when the respective player is determined to be relatively dominant over the opposing player using the weights, and randomly selects a type of event for the respective player among the second plurality of candidate types of event when the respective player is determined to be not relatively dominant over the opposing player using the weights, and controls a generation of a new event based on the selected type of event for the respective player, and wherein the request processing unit controls the terminal device of the respective player to display an event screen including an image of the new event in the game generated by the event management unit, via the network.

7. The game processing server apparatus according to claim 6, wherein the players associated with each other by the player management unit include the players belong to a first team and the players belong to another second team that compete against the first team.

8. The game processing server apparatus according to claim 6, further comprising:

wherein the event management unit manages event generation statuses of the players, respectively;

wherein in the table, the first plurality of candidate types of event and the second plurality of candidate types of event are further in correspondence with the event generation statuses of the players, respectively, and the event management unit randomly selects the type of event for the respective player from the table for which the event generation statuses are met.

9. The game processing server apparatus according to claim 6, wherein in the table, the first plurality of candidate types of event and the second plurality of candidate types of event are further in correspondence with time zones to which a current time is to be included, respectively, and the event management unit randomly selects the type of event for the respective player from the table for which the time zones are met.

10. The game processing server apparatus according to claim 6, wherein in the table, the weight for the candidate type of event that a character, for which a player is capable of obtaining a higher ability by beating the character, appears in the game for the target player is set higher when the status of dominance for the target player is not dominant compared with a case when the status of dominance for the target player is dominant.

11. A non-transitory computer-readable recording medium having recorded thereon a program for a game processing server apparatus that causes a computer including a processor and a memory, to which a plurality of terminal devices each operated by a player are connected via a network, configured to provide a game service which is a social RPG that manage all of the players and in which players do not directly fight against each other but compete with each other by at least obtained points in the game, to the plurality of terminal devices, and to execute functions comprising:

a request processing function that receives a request from each of the plurality of terminal devices and controls each of the plurality of terminal devices to display an event screen including an image of a predetermined event in a game, via the network, a player management function that registers the players in association with each other and manages the association of the players, the association of the players including an association of each of the players and an opposing player of the respective player;

an event management function that controls a generation of the predetermined event in the game for each of the players; and a player strength parameter management function that manages strength parameters of the players, respectively, wherein the event management function, for each of the players, determines a status of dominance for the respective player indicating whether the respective player is relatively dominant over the opposing player of the respective player based on to the strength parameters of the players, respectively, managed by the player strength parameter management function, refers to a table including a first plurality of candidate types of event and weights each of which is in correspondence with a condition of dominance indicating that a target player is relatively dominant over an opposing player, and a second plurality of candidate types of event and weights each of which is in correspondence with a condition of dominance indicating that a target player is relatively not dominant over an opposing player, randomly selects a type of event for the respective player among the first plurality of candidate types of event when the respective player is determined to be relatively dominant over the opposing player using the weights, and randomly selects a type of event for the respective player among the second plurality of candidate types of event when the respective player is determined to be not relatively dominant over the opposing player using the weights, and controls a generation of a new event based on the selected type of event for the respective player, and wherein the request processing function controls the terminal device of the respective player to display an event screen including an image of the new event in the game generated by the event management function, via the network.

12. The non-transitory computer-readable recording medium according to claim 11,
wherein in the table, the weight for the candidate type of event that a character, for which a player is capable of obtaining a higher ability by beating the character, appears in the game for the target player is set higher when the status of dominance for the target player is not dominant compared with a case when the status of dominance for the target player is dominant.

13. A non-transitory computer-readable recording medium having recorded thereon a program for a game processing server apparatus that causes a computer including a processor and a memory, to which a plurality of terminal devices each operated by a player are connected via a network, configured to provide a game service which is a social RPG that manage all of the players and in which players do not directly fight against each other but compete with each other by at least obtained points in the game, to the plurality of terminal devices, and to execute functions comprising:
- a request processing function that receives a request from each of the plurality of terminal devices and controls each of the plurality of terminal devices to display an event screen including an image of a predetermined event in a game, via the network;
- a player management function that registers the players in association with each other and manages the association of the players, the association of the players including an association of each of the players and an opposing player of the respective player;
- an event management function that controls a generation of the predetermined event in the game for each of the players; and
- a player fighting situation management function that manages fighting situations of the players, respectively,
- wherein the event management function, for each of the players,
  - determines a status of dominance for the respective indicating whether the respective is relatively dominant over the opposing player of the respective player based on the fighting situations of the players, respectively, managed by the player strength parameter management function,
  - refers to a table including a first plurality of candidate types of event and weights each of which is in correspondence with a condition of dominance indicating that a target player is relatively dominant over an opposing player, and a second plurality of candidate types of event and weights each of which is in correspondence with a condition of dominance indicating that a target player is relatively not dominant over an opposing player,
  - randomly selects a type of event for the respective player among the first plurality of candidate types of event when the respective player is determined to be relatively dominant over the opposing player using the weights, and randomly selects a type of event for the respective player among the second plurality of candidate types of event when the respective player is determined to be not relatively dominant over the opposing player using the weights, and
  - controls a generation of a new event based on the selected type of event.

14. The non-transitory computer-readable recording medium according to claim 13,
wherein in the table, the weight for the candidate type of event that a character, for which a player is capable of obtaining a higher ability by beating the character, appears in the game for the target player is set higher when the status of dominance for the target player is not dominant compared with a case when the status of dominance for the target player is dominant.

* * * * *